Nov. 6, 1962 M. C. SUPITILOV ETAL 3,061,873

MEANS FOR EMBOSSING PLASTIC BELTS

Filed May 14, 1954 4 Sheets-Sheet 1

INVENTORS.
Michael C. Supitilov,
Clifford E. Johnson,
& Oliver W. Norton
By: Robert L. Kahn Atty's.

INVENTORS.
Michael C. Supitilov,
Clifford E. Johnson,
& Oliver W. Norton
By. Robert L. Kahn Atty.

MEANS FOR EMBOSSING PLASTIC BELTS

Filed May 14, 1954 4 Sheets-Sheet 3

INVENTORS
Michael C. Supitilov,
Clifford E. Johnson,
& Oliver W. Morton.
By: Robert L. Kahn Atty.

MEANS FOR EMBOSSING PLASTIC BELTS

Filed May 14, 1954 4 Sheets-Sheet 4

INVENTORS.
Michael C. Supitilov,
Clifford E. Johnson,
& Oliver W. Norton.
By. Robert L. Kahn Atty.

United States Patent Office 3,061,873

Patented Nov. 6, 1962

3,061,873
MEANS FOR EMBOSSING PLASTIC BELTS

Michael C. Supitilov and Clifford E. Johnson, St. Charles, and Oliver W. Norton, Elgin, Ill., assignors to Du Kane Corporation, a corporation of Delaware Filed May 14, 1954, Ser. No. 429,842
7 Claims. (Cl. 18—5.6)

This invention relates to a means for embossing flexible plastic belts. The flexible plastic belts may be embossed to secure any desired pattern, and strips may at the same time be seamed to provide an endless belt having desired embossing on a surface thereof. While such plastic embossed belt may be used for a wide variety of purposes, one field of utility for such embossed belt is in sound recording.

In connection with sound recording, particularly magnetic recording, it is necessary to provide a sound track on the record material. In the case of magnetic recording and reproduction, the recording and reproducing process itself has no visible effect upon the record surface so that no physical sound track will be created during the process of magnetic recording or reproduction. It is desirable, therefore, to provide some physical means for controlling the travel of a sound reproducer or recording means in order that a definite sound track may be provided. A plastic belt embossed in accordance with the present invention may be used so that an embossed track is a guide in connection with recording and reproducing generally or such a belt with an embossed track may be used as a blank to be coated with magnetic material for sound recording and reproduction purposes.

The invention requires a die having the pattern to be embossed formed into the die surface. Cooperating with the die surface is a resilient wall member having means for generating or creating a force tending to move said resilient wall member toward the die surface. Between the wall member and the embossing die surface, the plastic material, either in the form of a strip or endless belt, is disposed. The force moving said resilient wall member is applied to the plastic sheet to force the plastic against the die surface under suitable conditions of heat to secure the embossing. The die is preferably cylindrical for ease in manufacture but may have other shapes.

The resilient wall member may be of suitable material and have suitable means for creating the force described above. For example natural rubber, fully cured and dense but elastic, available in the trade as "die rubber" or "press cushioning rubber," may be used in the form of a plug. This rubber has excellent recovery properties after compression. Synthetic rubbers such as the rubber copolymer of butadiene and acrylonitrile (Buna-N) and the rubber copolymer of butadiene and styrene (Buna-S) may also be used. Certain plastics, as polytetrafluoroethylene and polytrifluorochloroethylene, available in the trade as Teflon and Kel-F respectively, may be used. Silicone rubbers may also be used, as the high-compression type manufactured and sold by General Electric Company and the silicone rubber manufactured and sold by Dow Chemical Company under the trade name Silastic. It is preferred to have these silicone rubbers with a sufficient surface hardness (as for example about 80 durometer, Shore A gage) so that the plastic belt surface is smooth and glossy after embossing.

It will be understood that the resilient wall member may thus be constituted of any of the above materials or other suitable resilient materials and may assume a variety of forms. The various materials have their own individual advantages and disadvantages. Thus natural or synthetic rubber is substantially cheaper than the remaining materials given. On the other hand, such rubbers have the disadvantage of sticking to many plastics.

This necessitates, for quantity production, anti-sticking or release expedients. Teflon and Kel-F require higher compression forces than rubber or silicone rubber, but are the most desirable for anti-sticking.

In order to eliminate such sticking on rubber resilient wall members, we provide a thin sleeve of material between the rubber and plastic to be embossed, said sleeve being of Teflon or Kel-F, or silicone rubber.

The above halogenated polyethylene materials also have an additional property which is highly advantageous in connection with the present invention. Thus a Teflon sheet may be stretched or compressed slightly and upon release, the Teflon will shrink back to some intermediate dimension. This, of course, is on the assumption that the stretch or compression is small compared to the dimensions of the sheet. Thereafter, if the Teflon is stretched or compressed again to the same limit, it will return to the intermediate point. Apparently some orientation of the Teflon molecules occurs which imparts a limited degree of elasticity to the Teflon so long as the stress is confined to the above limit. This limited elasticity is large enough to accommodate the amount of movement necessary to force a work sheet of plastic of the order of about .020" in thickness against an embossing die surface. The length of the plastic sheet is great in comparison to the increase in dimension resulting from the stretch incident to forcing the work plastic into the embossing surface. This is also true of Kel-F.

Two general manners of embossing are possible. In one, a cylindrical die having an internal embossing surface may be used. The resilient wall member may be constructed like a plug so that longitudinal compression may be utilized for securing lateral expansion. A chamber having a resilient wall may also be used. The other manner of embossing requires a die having an external embossing surface. The resilient wall member in such case may be a sleeve which may be longitudinally compressed to provide inward expansion. An annular chamber having a resilient wall may also be used. The plastic material will in all instances be forced tightly against the embossing die surface under suitable temperature conditions.

For a more complete description of the invention, together with its advantages, reference will now be made to the drawings wherein several exemplary embodiments are illustrated. It is understood, however, that such embodiments constitute examples and that substantial variations in both the apparatus and method are possible without departing from the scope of the invention except as defined by the appended claims.

Referring therefore to the drawings.

Figure 1:
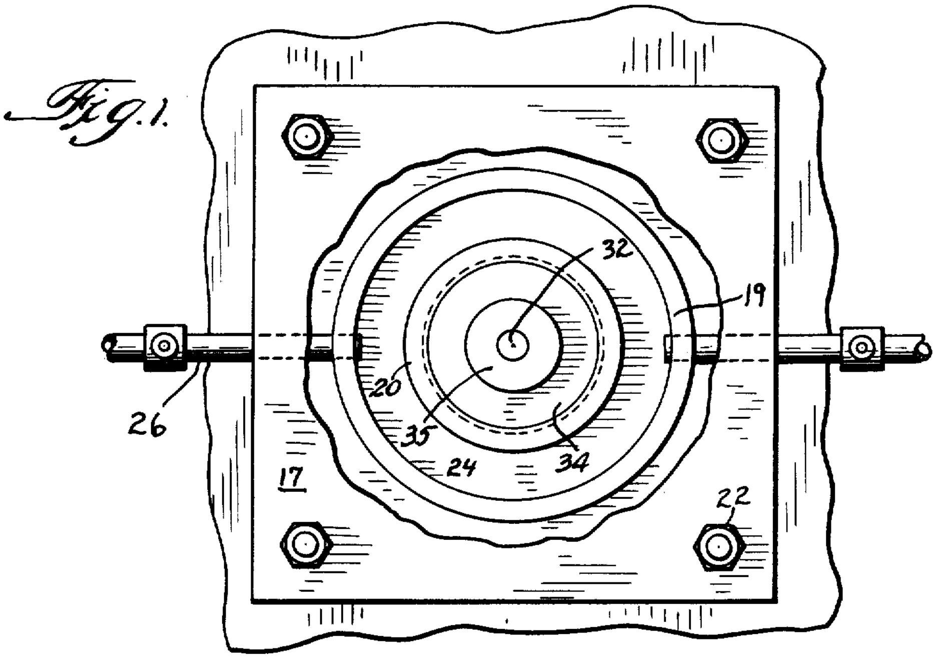
FIGURE 1 is a top plan view of a portion of one form of apparatus embodying the present invention.
Figure 2:
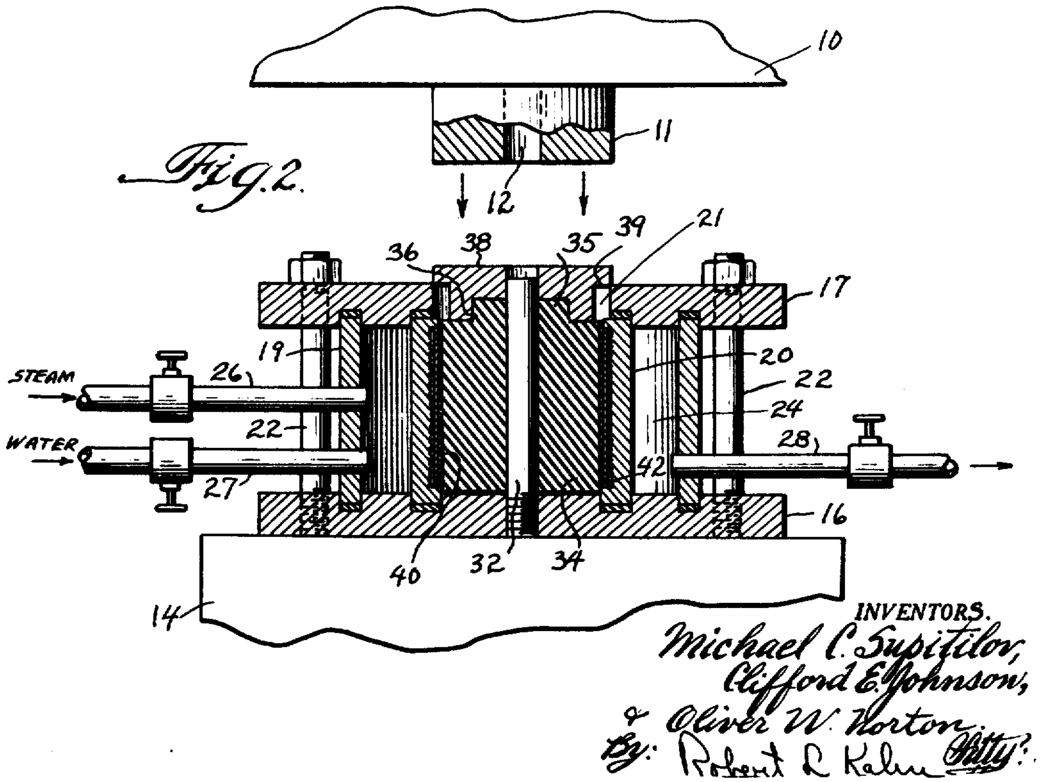
FIGURE 2 is a transverse section of the apparatus of FIGURE 1.

Referring first to FIGURES 1 and 2, a press is utilized having ram 10 for exerting pressure. Ram 10 carries block 11 having centrally disposed channel 12. Block 11 is of steel and may have a cylindrical configuration.

Disposed upon base 14 of the press is an assembly having base plate 16 and top plate 17 vertically spaced from each other. Disposed in suitable annular channels in the opposed surfaces of plates 16 and 17 are cylindrical members 19 and 20. Members 19 and 20 are seated in the annular channels and there may be suitable gaskets of rubber or other material to provide tight fits and permit the various parts to seat properly. Top plate 17 has circular cut-out 21. Plates 16 and 17, together with cylindrical members 19 and 20 are maintained intact as a unit by bolts 22. As illustrated in FIGURE 1, plates 16 and 17 have a generally rectangular shape so that the bolts may be at the corners. This, however, is unimportant and may be varied to suit requirements.

Cylindrical member 19 is of metal or any other suitable rigid material. Members 19 and 20 and parts of plates 16 and 17 define annular chamber 24 between the two cylindrical members. This annular chamber constitutes a jacket for heating or chilling as required. Communication to the jacket thus formed is provided by pipes 26, 27 and 28 passing through cylindrical member 19. These pipes are sealed in member 19 and are each provided with valves as illustrated. Pipe 26 may, for example, be a supply pipe for steam or hot water or any hot liquid having heat at a desired temperature. Pipe 27 may supply water or other liquid for cooling purposes. Pipe 28 is an exhaust pipe for either the hot or cold medium.

In order to permit a rapid change in the temperature involved in the use of the apparatus, plates 16 and 17 and cylindrical members 19 and 20 may be of metal, as aluminum or brass. The latter may be more desirable as it is stronger, does not expand and contract so much, and is generally easy to work with. However, the nature of the material is unimportant within wide limits and it is not even necessary that all parts thus designated be of the same metal or of the same solid.

Cylindrical member 20 has part of the interior surface thereof as a die. In this particular instance, the die surface may have a shallow thread having the desired fineness and pitch. The lands or flat spaces between adjacent threads may be as desired. This portion of the die may be of bronze or the entire cylindrical member 20 may be of bronze or steel in order to provide desired die characteristics. The details of the die will be considered later.

Disposed within the center of the space defined by die cylinder 20 is post 32. Post 32 is of steel or suitable metal and has the bottom portion thereof threaded into bottom plate 16. Post 32 has its free end near the plane of the top surface of plate 17. The length of post 32 is not important. Post 32 is alined with channel 12 of the ram member and is somewhat smaller in diameter than channel 12 so that the post may enter the channel upon the downward movement of the ram. The post and channel may be omitted, as will be apparent later.

Plug or cylindrical block 34 of resilient material is disposed within die cylinder 20 and immediately around post 32. The fit of block 34 around post 32 is not important. Block 34 may be of solid rubber of the type previously described or of other material as Teflon or Kel-F or silicone rubber. Block 34 has top end 35 of reduced diameter to provide annular shoulder 36.

Resting upon the top end of block 34 is pressure transmitting member or plunger 38. Plunger 38 has the bottom surface thereof stepped to correspond generally to the shouldered end of block 34. Plunger 38 in addition has its peripheral portion stepped to form shoulder 39. Shoulder 39 is movable within cut-out 21 of top plate 17. The shouldered top of resilient member 34 extends up within circular cut-out 21 in plate 17. The cut-out diameter is large enough so that resilient member 34 may be easily removed.

The normal shape of resilient member 34 is generally as shown, the external cylindrical surface of member 34 being generally smooth. If block or plug 34 is of Teflon or Kel-F or silicone rubber, no anti-stick means need be provided. As previously pointed out, however, the halogenated polyethylene materials require large compressive forces. Plugs or Teflon or Kel-F or of silicone rubber are expensive. It is therefore generally preferred to make plug 34 of natural or synthetic rubber. Although anti-sticking compounds, as silicones or graphite, may be used, or anti-sticking means may be omitted (with some inconvenience), it is simpler to provide sleeve 40 of anti-stick material. Thus with a plug of natural or synthetic rubber, sleeve 40 may be of Teflon or Kel-F and may have a thickness of about the same order as the plastic to be embossed. As an example, plastic sheet .020" may be embossed and sleeve 40 may be of Teflon about .030" thick. If the sleeve is to be of silicone rubber, then a greater thickness, as about ⅛" for example, may be desirable. These dimensions are exemplary. The anti-stick sleeve may be as thick, thinner than or thicker than the raw plastic sheet to be embossed. In general, the anti-stick sleeve will extend beyond the ends where embossed plastic may be encountered.

Plunger 38 is loose and may be removed from the top of plug 34 to permit of the introduction of a belt or strip of plastic material in space 42 between the opposed plug and die surfaces. If the work piece to be embossed is a strip of plastic, the strip ends may be overlapped for a short distance, say up to about ¼", or a butt joint may be made. Space 42 may be large enough to accommodate the overlapping, no matter where it occurs around the plug. Thereafter, plunger 38 is positioned as shown and the jacket is heated, as by the introduction of steam or hot water. Ram 10 moves down with member 11 engaging plunger 38. The ram pressure forces the plunger downwardly and results in endwise compression on plug 34. The rubber or other material is forced to expand laterally and drives the soft plastic (work) up against the die surface. Pressure will generally be maintained until the plastic is cooled, after which the belt may be removed.

Figures 3, 4:
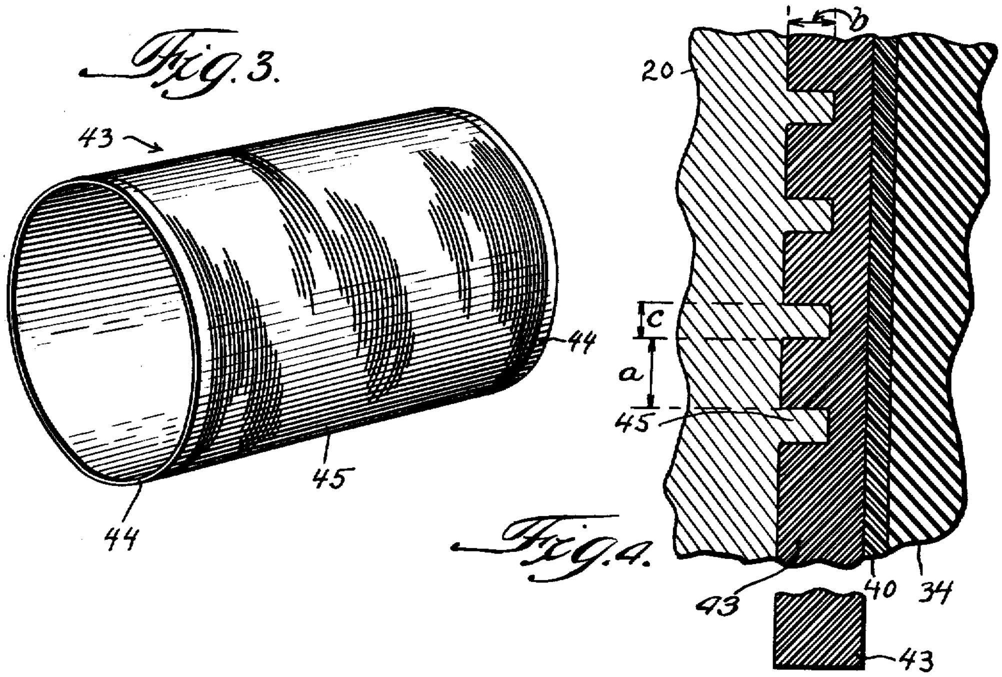
FIGURE 3 is a perspective view of an embossed belt.
FIGURE 4 is an enlarged sectional detail of a portion of the embossing die and plastic material.

At this point, the desired product and die details may be considered. Referring to FIGURE 3, an embossed plastic belt 43 is illustrated. Belt 43 has smooth ends 44 and intermediate record portion 45. The belt may have a thickness of the order of between about .012" and about .025" and the width and length may be as desired. Thus belts having a width of about 4" and a circumferential length of about 10 to 12 inches may be used. A track groove having a pitch of between about 25 and about 100 threads to the inch may be provided. A pitch of about 50 to the inch has been found satisfactory. Belt 43 has a groove or track, as illustrated in FIGURE 4, resembling a screw thread having square sides and flat top or land. No attempt to show proportions has been made. The flat top dimension *a* may be about .015" wide. The depth *b* of a record groove may be about .009" in the present example. The groove separation *c* between adjacent belt tops will depend on pitch. With 50 threads to the inch, the present example will provide .005" for dimension *c*. It is understood that the above figures are exemplary and will depend on such factors as thickness of record, width of sound track, separation of tracks, fineness of tracking stylus, and others.

Figures 8A, 9, 10:
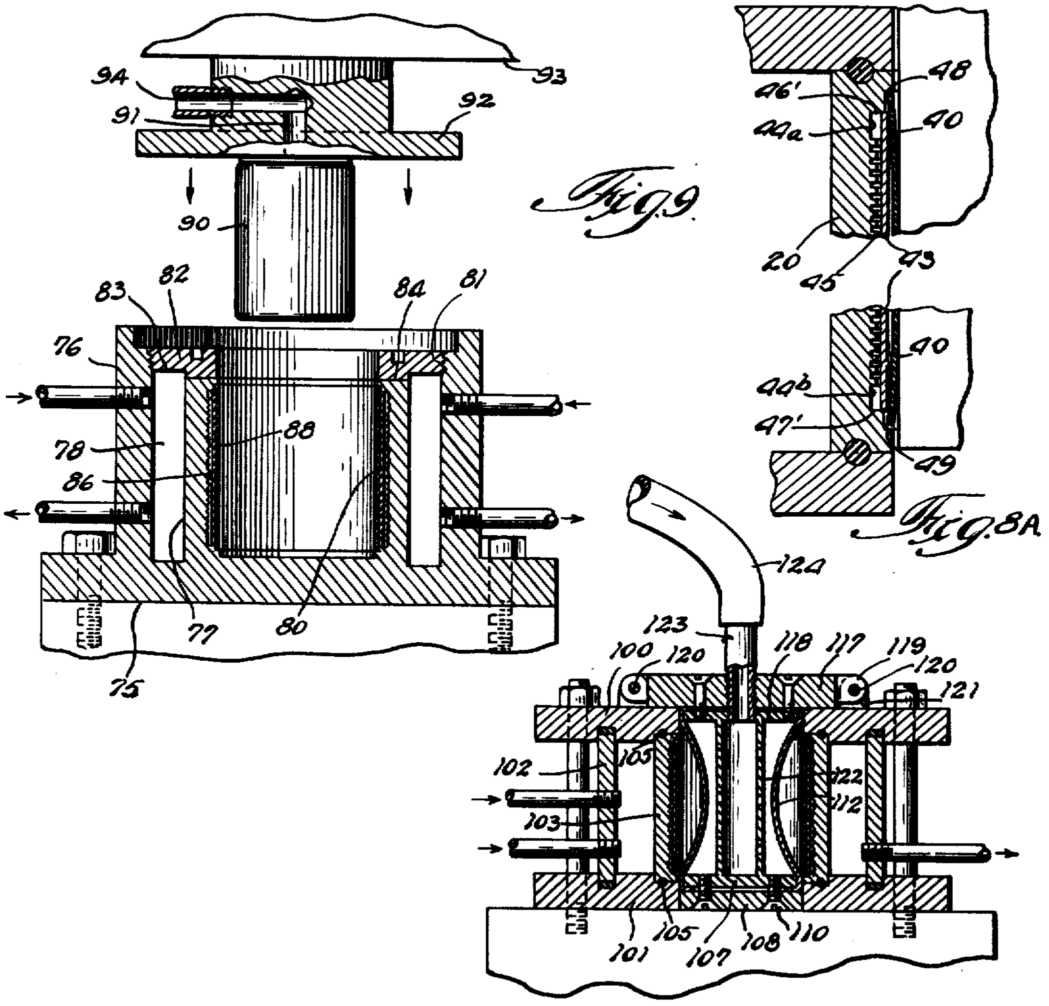
FIGURE 8A is an enlarged detail of a part of a modified embossing die.
FIGURE 9 is a sectional elevation showing a further modification of apparatus for embossing in accordance with this invention.
FIGURE 10 is a sectional elevation of a still further modification of embossing apparatus embodying the present invention.

For convenience in quick handling and proper positioning of the plastic stock in preparation for embossing, arious die constructional details may be provided. In :IGURE 8 is shown one die construction feature and ı FIGURE 8A is shown a modified die construction eature. Either of these constructional modifications may e used with any of the apparatus modifications.

Figures 7, 8:
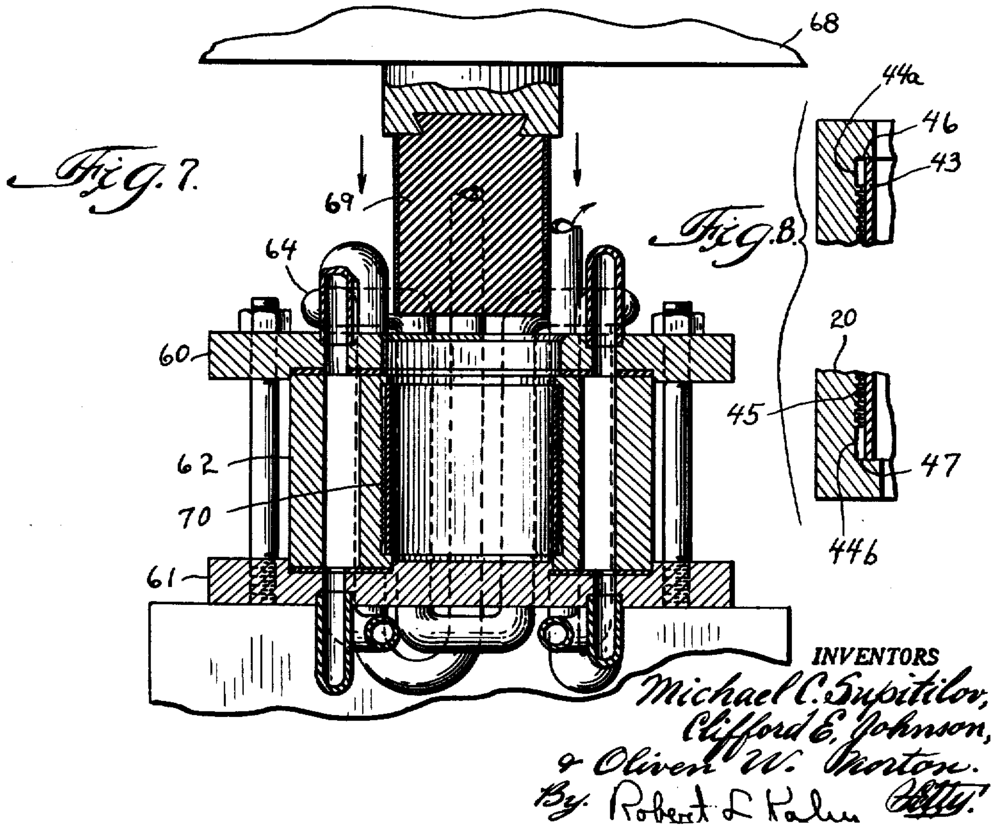
FIGURE 7 is a sectional elevation of the modification taken on line 7—7 of FIGURE 6.
FIGURE 8 is an enlarged detail of a part of an embossing die.

Referring to FIGURE 8, the die surface has undercut arts 44a and 44b which are smooth and part 45 havıg an embossing part as a track generating surface. The ɔp and bottom ends of the die have ledges 46 and 47, ıe bottom ledge being larger. The tcp ledge depth is bout equal to the thickness of the plastic stock used nd in general the thickness of the plastic stock prior ɔ embossing is about the same as the finished belt. No ttempt to show the correct proportions of die parts on he drawing has been made. The body of resilient memer 34 extends beyond the two die ledges. It is essential hat the die material be continuous from one ledge to he other to avoid the formation of any flash on the lastic belt record side.

In FIGURE 8A is shown a modified die construction. )ie part 20 has undercut parts 44a and 44b and emossing part 45 as in FIGURE 8. However, ledges 46' nd 47' are about equal in depth and the depth is such hat plastic stock 43 will be held at the top and bottom dges. As shown in FIGURE 8A, plastic sheet 43 has art of its thickness extending outside of the ledges. This ; not essential. For best results, sheet 43 should be cut ccurately and the resulting embossed belt will then come ut accurately to size.

Beyond ledges 46' and 47' are ledges 48 and 49, these eing about the same depth as the thickness of sleeve 0 of Teflon or Kel-F or silicone rubber as desired. Again the depth of ledges 48 and 49 is not critical and he depth may be less than, equal to, or somewhat greatr than the thickness of sleeve 40. It is preferred, howver, to have the depth of ledges 48 and 49 either equal o or somewhat smaller than the thickness of sleeve 40. As illustrated in FIGURE 8A, the separation between edges 48 and 49 may be somewhat less than the correponding dimension of sleeve 40 so that sleeve 40 will end to bow away from the plastic stock. This makes it :onvenient for handling and production. The remaining letails of FIGURE 8A will be described in connection vith the modifications illustrated in FIGURES 10 and 11.

While softening of the plastic during embossing or eaming is essential, at no time does the plastic attain ı condition of liquidity where leakage beyond the die nds occurs. This is true even for the higher temperaures required by seaming. In general, pressure and temɔerature are interrelated for obtaining plastic deforming or welding conditions. Thus a simple increase in pressure ıt the same temperature may be required for welding as ıgainst deformation.

To emboss a belt, sheet or belt of plastic is disposed near the die surface. In the die as shown in FIGURE 8, :he bottom edge of the plastic may rest on bottom ledge 47'. The top edge of the plastic may be tucked under op ledge 46'. It is necessary to remove plug 34 and piston 38 to position the plastic. If sleeve 40 is used, it will be disposed of within the plastic work in FIGURE 2, or the sleeve may be disposed around the resilient plug in FIGURE 2.

In the die shown in FIGURE 8A, the placement of plastic sheet 43 and sleeve 40 will be determined by the ledges.

Assuming that the plastic has been heated to a suitably soft condition, the ram is brought down on piston 38. The pressure of the resilient material against the hot plastic forces the plastic tightly against the die surface for embossing. Any space between post 32 and the interior of block 34 will allow some internal expansion. The same is true of the interfit of the various parts between the elastic material and metal. Thus the only accuracy required is in the die. The plastic is heated to a desired temperature and the pressure is maintained for a sufficient time to insure satisfactory embossing. If a plastic strip is used, temperature conditions must be right for welding as well as embossing.

Assuming that embossing has been accomplished, it is generally necessary to cool the plastic before separation from the die. Preferably while the pressure is still on the resilient member, the jacket is now cooled by water or other cooling medium and the die cylinder chilled. With the plastic belt cooled below its melting point or softening point, pressure on the plug may be removed. Piston 38 may be raised. The plug, assuming a normal contracted position, may be removed and the embossed belt may now be stripped from the die surface.

Figure 5:
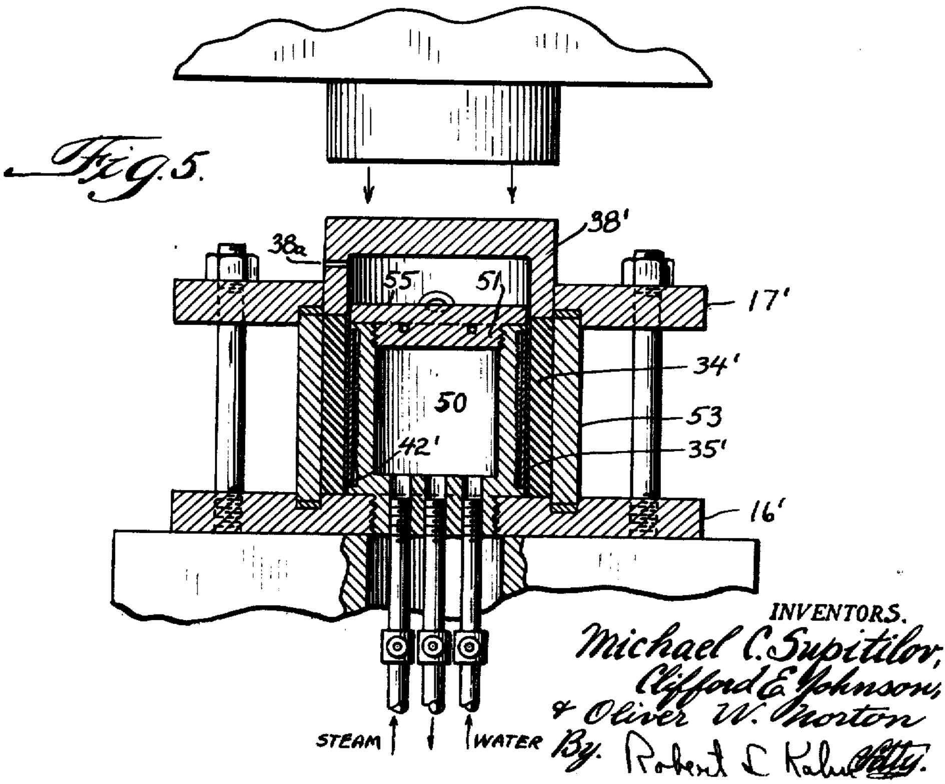
FIGURE 5 is a sectional elevation of a modified form of apparatus.

Referring to FIGURE 5, a modified form of apparatus is shown. The die surface is formed on the outside of hollow cylinder 50. The die surface, including the grooved part, undercut smooth ends and ledges, may be as illustrated in FIGURES 8 or 8A. Cylinder 50 has a threaded extension at the bottom for screwing into a tapped aperture in bottom plate 16'. The threaded extension covers the bottom of cylinder 50 but has threaded apertures for receiving pipe connections for hot and cold fluids and exhaust. Cap 51 having external threads provides a flush closure for the cylinder top.

Around cylinder 50 but spaced therefrom to provide annular region 42' is resilient sleeve 34'. Surrounding and backing up the outer cylindrical surface of sleeve 34' is metal cylinder 53 sealed between plates 16' and 17' as in FIGURE 2. Top plate 17' has circular cut-out 21' equal in diameter to the normal outside diameter of sleeve 34'. Slidable within cut-out 17' is hollow plunger 38', shaped like an inverted cup with the free edge dimensioned to engage the top annular end of sleeve 34'. Plunger 38' has aperture 38a through the side for air relief.

Sleeve 34' may be of Teflon or Kel-F or silicone rubber. If sleeve 34' is of natural or synthetic rubber, then liner 35' of Teflon or Kel-F or silicone rubber is provided. The thickness and length of liner 35' may be the same as for sleeve 40 in FIGURE 1.

Loosely disposed on top of die cylinder 50 is massive plate 55. Resilient sleeve 34' extends above the top of cylinder 50. Plate 55 is large enough so that it may reach beyond the die surface and be close to the free part of resilient sleeve 34' above the top of cylinder 50. The amount of free material of sleeve 34' extending above the top of cylinder 50 is such that, in spite of downward compression force on the end of the resilient sleeve, there will be some material to engage the bottom peripheral portion of plate 55. Plate 55 clears the inside wall of plunger 38' so that a downward force on plunger 38' will permit it to move down free of plate 55. Plate 55 is provided with a ring handle and both it and plunger 38' may be readily removed so that plastic sheet stock may be introduced into annular region 42'. As in FIGURE 2, the sheet stock may be a belt or strip of the correct thickness and dimension.

Pressure by the ram on plunger 38' will cause the top end of resilient sleeve 34' to hug the bottom of plate 55 tightly enough so that softened plastic will not escape.

To remove an embossed belt from the apparatus illustrated in FIGURE 5, it may be necessary to remove the resilient sleeve as well as plate 55 and plunger 38'. A small part of the belt near the bottom ledge is worked loose, after which a jet of compressed air may be used to blow the belt loose.

It is possible to omit the threaded extension at the bottom of cylinder 50 and omit the threading in bottom plate 16' and have the cylinder extension smooth for a slide fit in the aperture in the bottom plate 16'. The various pipes to the bottom of cylinder 50 may be flexible. This will permit cylinder 50 to be raised above top plate 17' and render the embossed belt more accessible for removal.

Figure 6:
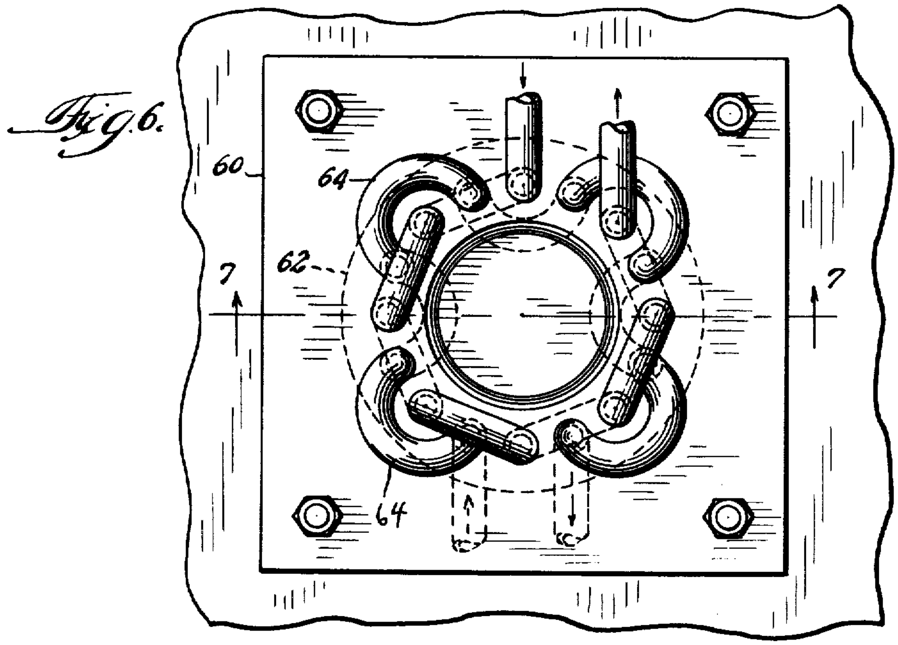
FIGURE 6 is a top view of a further modification.

It is also possible to attach the resilient plug or sleeve to the ram. A modification where the resilient plug is carried by the ram is illustrated in FIGURES 6 and 7. In this modification, top and bottom plates 60 and 61 have tightly gripped between them massive sleeve 62 of metal. Sleeve 62 has a number of longitudinal apertures through its thick wall. Alternate apertures are connected together by pipe fittings 64 to form one continuous fluid path having an inlet and outlet. The remaining apertures are similarly connected to form a second continuous fluid path. While the sleeve apertures are shown as connected in series in the two path systems, they may be connected in parallel. One fluid path is for heating the sleeve and the other path is for chilling the sleeve. The arrangement and pattern of the various apertures may be varied.

The inside surface of sleeve 62 resembles the inside surface of the die sleeve in FIGURE 2. The grooving, smooth ends and ledges may be as illustrated in FIGURE 8 or FIGURE 8A. Top plate 60 is cut out, as in FIGURE 2, the cut-out diameter being somewhat greater than the die diameter at the inside surface of the top die ledge. The cut-out is countersunk at the top surface of the top plate. The structure so far described is rigidly supported. Ram 68 carries resilient block 69. The two may be joined in any suitable fashion by annular dove-tailing, the resilient material being crowded in. Resilient block 69, if made of natural or synthetic rubber, has disposed around it sleeve 70 of Teflon or Kel-F or silicone rubber to provide a resilient, deformable plug. The entire plug has a normal diameter somewhat smaller than the inside diameter of a plastic blank. The plastic blank may be inserted into the die region or around the resilient plug. In any event, the resilient plug should be small enough in diameter to be positioned inside of the plastic blank as in FIGURE 2, prior to the application of pressure on the plug.

It is generally desirable to have the plastic blank thoroughly hot and softened to avoid undue wear or damage to the dies. One of the smooth parts of the die adjacent the threading may have some die shaping to emboss arrow heads or matter to distinguish one belt edge from the other.

Because the dies are continuous circularly, it is clear why the plastic must be flexible during removal. The belts must be capable of folding in to clear the die surfaces in the forms of apparatus illustrated in FIGURES 1, 2, 6 and 7. In the modification illustrated in FIGURE 5, the plastic must be flexible enough to give so that the belt may be pulled off the die.

The various forms of apparatus so far described utilize a compressible solid for generating the embossing pressure. In the case of a resilient plug, it is clear that some axial displacement of the plug material occurs, the amount varying with the distance from the free end of the plug. Thus referring to FIGURE 2 as an example, the bottom of the resilient plug will first be pushed down against the surface of bottom plate 16. The free end of the plug will now be fixed with reference to the plastic sheet. As the ram compresses the plug, the top of the plug will be forced downwardly. The amount of vertical displacement of the plug material will decrease from a maximum at the plug top to a minimum at the plug bottom. While this displacement of plug material may be small, in terms of groove pitch on the embossing die it may be substantial. In such case, a sleeve of Teflon or Kel-F or even silicone rubber performs a useful function. These materials have natural lubricating properties. If the resilient plug is of natural or synthetic rubber, or other material which may stick, then the sleeve will permit the plug material to move along the sleeve material. The plastic sheet will still be forced in perpendicular to the die surface and there will be no danger of sideswiping the die grooves or deforming the plastic grooves after the embossed plastic has been cooled and the pressure on the plug is being released.

There will now be disclosed modifications wherein the movement of pressure-generating means along the general die surface will be eliminated. It is possible to emboss by applying the pressure developed by compressing gas or liquid in a closed expansible means. In general, liquid is preferred for the reason that high pressures may be built up in a body of liquid with simple and relatively small pump means. However, it is to be understood that while liquid is preferred, it is possible to use gas.

Referring now to FIGURE 9, base block 75 has outer and inner cylindrical sleeves 76 and 77. Annular region 78 between the opposed surfaces of sleeves 76 and 77 provides a jacket similar to jacket 24 in FIGURE 2. The outer sleeve has a number of pipes for incoming and outgoing heating or cooling means as required.

Inner sleeve 77 has on the inside surface thereof cylindrical embossing die 80. Die 80 may be a separate thin sleeve of metal having the die embossing surface and provided with ledges at the two ends. The ledge construction may follow that illustrated in FIGURE 8 or FIGURE 8A. It is also possible to have a bottom ledge only for the flexible sleeve and omit top ledge 48 in FIGURE 8A. In such case, bottom ledge 49 should be wide enough to hold the sleeve.

Die 80 and inner sleeve 77 may also be integral. Outer sleeve 76 has threaded portion 81 near the mouth of annular jacket chamber 78. Annular plate 82 having the outer part suitably threaded engages threaded part 81. Plate 82 is designed so that part 83 forms a cover for the top of anular jacket chamber 78 and part 84 is disposed over the end of inner sleeve 77.

Plastic sheet 86 to be embossed is disposed adjacent the embossing surface of the die in a manner as previously described. This plastic strip may be either an endless belt or may be a strip cut to required length so that the opposing edges will abut. Disposed against the inner surface of plastic work strip 86 is endless sleeve or belt 88 of Teflon or Kel-F or silicone rubber. This belt is accurately sized for circumferential length and width and is wide enough to cover the full width of work strip 86.

For providing the necessary embossing pressure, expansible bag 90 of natural or synthetic rubber or other elastic material is provided. This bag has neck 91 and is suitably mounted upon head 92 of a vertically movable member 93. Pipe 94 connects with neck 91 of the bag, the pipe being flexible and strong enough to withstand the required pressure. Head 93 is adapted to be moved down so as to dispose expansible bag 90 within the die chamber. Head 92 is shaped to snugly fit over annular plate 82 and within a shoulder formed at the top of outer sleeve 76. Head 92 is retained in position against the top of plate 82 to prevent the pressure developed in bag 90 from raising the head out of the die chamber. Pipes for heating and cooling liquid for jacket 78 are provided.

If bag 90 is of Teflon or Kel-F or silicone rubber, sleeve or belt 88 may be omitted. If desired, head 92 may be formed as a cover provided with retaining hooks or bolts for maintaining the cover tightly against outer sleeve 76 in a manner resembling a pressure cooker.

Figure 11:
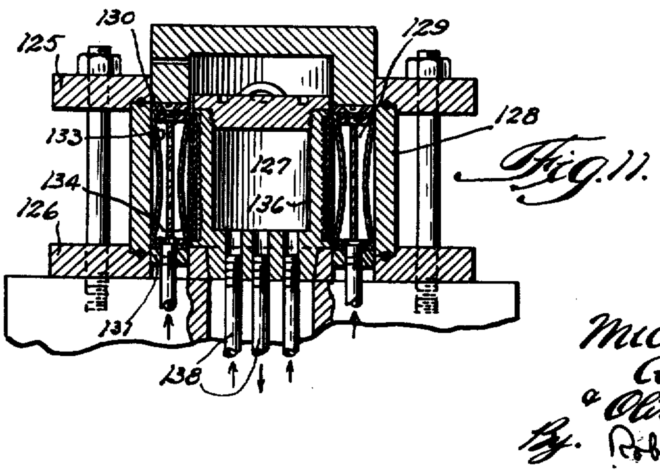
FIGURE 11 is a sectional elevation of an additional modification of the apparatus embodying the present invention.

In FIGURES 10 and 11 modifications are shown utilizing Teflon or Kel-F as the expansible material. Neither of these materials can be satisfactorily cemented to metal or other material. The means illustrated shows how it is possible to utilize these plastics without resort to cementing. While the means illustrated may be used in connection with natural or synthetic rubber or with silicone rubber, such means in general need not have certain details illustrated in FIGURES 10 and 11 for the reason that the rubber material specified above may be cemented.

Referring to FIGURE 10, there is provided a construc- n which in some respects is similar to FIGURE 2. ıus top and bottom plates 100 and 101 are bolted to- :her and have clamped therebetween outer and inner id metal sleeves 102 and 103. Outer sleeve 102 may set in recesses in top and bottom plates 100 and 101 d gaskets may be disposed in these recesses in a manner ıilar to that illustrated in FIGURE 2.

Inner sleeve 103, however, is provided with a modified ısket arrangement. The top and bottom edges of inner eve 103 are accurately finished and fit against accurate- finished surfaces in the top and bottom plates. In GURE 8A, the sleeve is shown as resting against flat :faces of the top and bottom plates. In FIGURE 10, :urately finished annular shoulders are provided in : top and bottom plates. Gasket 105 having a generally cular cross-section is disposed within the semi-circular ooves in the two edges of the sleeve and the correspond- ; surfaces of the top and bottom plates. The gasket to prevent leakage of fluid from the jacket chamber rmed between sleeves 102 and 103. An accurate fit be- een the metal surfaces adjacent the gasket will gen- llly suffice to prevent any plastic material from being :ced into a crack. This will be more clearly under- ıod after the construction in FIGURE 10 has been ly described.

Inner sleeve 103 either carries as a separate piece or s formed thereon on the inside a die embossing sur- :e in a manner generally similar to the preceding con- uctions described. The die embossing surface will be ıilar to that illustrated in FIGURE 8 or FIGURE 8A, : latter construction being actually illustrated in the ıwing. Inasmuch as the expandable material to be :d is non-sticking, no provision need be made for a eve of Teflon or Kel-F as illustrated in FIGURE 8A. cordingly, the construction illustrated in FIGURE 8 ıy be preferred with the exception that the bottom lge 47 need not necessarily be deeper than the belt be embossed.

The chamber within which pressure is to be generated ısists of a skeleton framework having rigid clamping ıtes at the top and bottom for gripping the edge of the ıstic. Thus at the bottom of the pressure chamber, cular plates 107 and 108 are provided, these plates ving suitable apertures disposed at uniform intervals ır the edges. As illustrated, inner plate 107 has the ertures tapped so that bolts 110 may be used for draw- ; the plates together. Gripped between the edges of the ıte is the edge of flexible sleeve 112 of Teflon or Kel-F. e bottom edge of sleeve 112 may be crimped or folded ɜr by heating so the material softens or melts and can ın be shaped. With the inwardly directed flange thus :med of the plastic, plates 107 and 108 may be tightly ıwn together by bolts to grip the plastic edge and form ufficiently tight seal for the pressures used. In general, flon and Kel-F have sufficient cold flow so that by :ating a high compression on the plastic edge, a tight ıl may be obtained.

It is understood that plates 107 and 108 will be of table metal such as brass, steel or the like and will heavy enough and strong enough so that satisfactory mpression on the plastic may be obtained.

The top end of sleeve 112 will be similarly gripped tween plates 117 and 118. Plate 117 is massive and s suitable ears 119 to be retained by pins 120 to ears 1 provided upon the outer surface of top plate 100. is provides a sturdy anchoring means to retain plate 117 htly against the top of plate 100. Any other type of :king of plate 117 to top plate 100 may be used.

The top and bottom parts forming the chamber may maintained in rigid spaced relation by pipe 122 rigidly :ured to plates 107 and 118. Pipe 122 is provided :h a plurality of apertures so that liquid or gas supplied the inside of pipe 122 will easily flow through the lls of the pipe.

It is possible to remove the entire chamber by removing the pins to free the top plate. It is understood that bottom plates 107 and 108 will be small enough to permit the bottom of the chamber to clear the die surface and pass through the cut-out in the top plate.

Plates 117 and 118 have tapped apertures therethrough into which is fitted nipple 123 having attached theretc flexible hose 124. Outer sleeve 102 may be provided with inlet and outlet pipes for heating and cooling as illustrated, for example, in FIGURE 2.

Referring now to FIGURE 11, a modification generally resembling FIGURE 5 is illustrated, this modification, however, being similar to the construction illustrated in FIGURE 10 in that a non-cementable material such as Teflon or Kel-F may be used. The general construction of top and bottom plates 125 and 126 with a centrally disposed chamber 127 for heating and cooling is the same as illustrated in FIGURE 5. In this figure, chamber 127 has the bottom extension shaped so that the chamber has a slip fit in the smooth aperture in bottom plate 126. The supply pipes for the chamber will be flexible. The gasket construction between sleeve 128 and the top and bottom plates is generally similar to the construction illustrated in FIGURE 8A and in FIGURE 10. Instead of an annular resilient member of solid material as in FIGURE 5, there is provided annular chamber 1·9 having expansible walls resembling the chamber described in FIGURE 10. Thus top and bottom annular clamping rings 130 and 131 may be provided. Each clamping ring consists of two parts tightly bolted together by bolts as illustrated. As shown in FIGURE 11, the inside and outside walls 133 and 134 of the annular chamber are formed of plastic with the edges crimped and clamped between the edges of rings 130 and 131. Outer wall 134 of plastic may be dispensed with and instead there may be provided a solid metal wall permanently joined to the clamping rings. Inside wall 133 must be flexible and in the construction illustrated may be of Teflon or Kel-F.

In order to maintain the spacing between the top and bottom clamping rings constant, a perforated heavy metal sleeve 136 may be disposed within the annular chamber, this perforated metal sleeve being rigidly joined to the top and bottom clamping rings. Thus the chamber may be accurately dimensioned and pressure within the same will only affect the one or two flexible walls.

The annular chamber thus formed may be provided with one or two pipes 138 for introducing gas or liquid under pressure. The chamber thus formed will withstand the pressures without benefit of any ram as is true in FIGURE 5, for example. The pressure of inner flexible wall 133 against the ends of the embossing die cylinder metal will provide a generally satisfactory seal. The same is true of the construction illustrated in FIGURE 10.

The embossing apparatus herein disclosed is particularly useful in connection with the manufacture of a plastic belt for use in magnetic sound recording and reproducing. In particular, and as more fully disclosed and claimed in the co-pending application of Michael C. Supitilov, Serial No. 437,541, filed June 17, 1954, now Patent No. 2,937,028, issued May 17, 1960, a belt of flexible nylon has particularly desirable properties as a record belt. Such an embossed record belt may be coated with a magnetizable iron oxide mixture of conventional composition or may be coated with the composition of magnetizable iron oxide with a nylon binder, as more fully disclosed and claimed in said co-pending application.

The embossing with the apparatus herein disclosed is particularly effective on nylon which has a suitable temperature range within which nylon may be heated for softening the same. The nylon, as with practically all other known plastics, will soften at a substantially lower temperature than the softening or decomposing temperature of Teflon or Kel-F or silicone rubber. Hence a compressible member of Teflon or Kel-F or silicone rubber or of rubber having sleeves or liners of Teflon or Kel-F or silicone rubber may be used. The resulting embossed belts are free of ridges or irregularities to a remarkable degree even when strips of plastic are used so that seaming as well as embossing is effected.

It will be clear that there is provided an annular region having opposed walls between which walls the plastic strip or belt to be embossed will be disposed. One of the opposed walls constitutes a rigid die surface having suitable surface markings to function as an embossing die surface. The other opposed wall is resilient. Means are provided for creating or impressing a force on said resilient wall so that the wall moves toward the plastic strip and forces the strip against the embossing die surface. Suitable means for heating the die are provided so that embossing may be effected. Means for cooling the die are also provided so that an embossed belt may be quickly removed.

As hereinbefore pointed out, in certain forms of the apparatus, considerations of cost may favor the use of materials as natural or synthetic rubber, which materials may have a tendency to adhere to the plastic after an embossing operation. In accordance with the invention, a supplementary resilient wall may be provided between the rubber and plastic to be embossed, said supplementary resilient wall consisting of a material which has little or no tendency to stick to plastic. Examples of such materials are certain halogenated polyethylenes, notably the fluorinated polyethylenes such as Teflon or Kel-F. Other materials such as the silicone rubbers referred to may also be used. Other plastics having such non-stick properties may also be used.

In order to maintain accuracy to the width of the embossed belt, the embossing die surface has ledges at the ends thereof for maintaining the edges of the embossed plastic. It is preferred to have the resilient wall which contacts the plastic to be embossed extend beyond the edges of the plastic, such extensions of the resilient wall cooperating with smooth surfaces beyond the embossing surface to insure that the resiilent wall pressing the plastic against the embossing surface will form a seal with the ledges to retain the plastic material within the desired embossing region. Thus accurate width of the belt will be maintained and generally eliminate subsequent trimming.

Where the plastic to be embossed consists of a strip rather than an endless belt and thus requires seaming, two alternative procedures may be utilized. It is possible, as previously indicated, to have the length of the plastic strip great enough so that some overlap will occur. This may in some instances result in a slight thickening of the belt material at the seam. If this is objectionable, the edges of the plastic to be seamed may be disposed in abutting relation. The plastic strip will, of course, be slightly longer than the finished belt to be embossed. Where a sleeve such as of Teflon is used, it is possible to dispose the sleeve against the plastic strip to maintain the abutting edges in position. Thereafter the heat and force created for embossing and seaming will result in a compressive force maintaining the opposed edges of the plastic sheet in tightly abutting relation thus insuring welding of the edges into a unitary structure. If the plastic strip is too short so that the edges are not substantially in contact, there is a possibility that the embossed plastic will not have been welded.

What is claimed is:

1. Apparatus for producing an endless plastic belt and for embossing the same upon one side thereof, said plastic being susceptible to softening under heat, said apparatus comprising a rigid die plate having a cylindrical embossing die surface over a substantial portion thereof, said die plate being continuous circularly and having ledges at the ends thereof, resilient means normally spaced from said embossing die surface so that a plastic strip may be disposed in proximity to said embossing die surface, said die ledges overhanging the plastic strip when said plastic strip is disposed against the embossing surface, said resilient means lying against the ledges, means for creating a force on said resilient means so that said resilient means moves against the plastic sheet and forces the same against the embossing die surface, said resilient means cooperating with the die ledges for sealing the ends of the space where the plastic sheet lies and means for heating the plastic sheet to a desired temperature.

2. The apparatus according to claim 1 wherein said resilient means consists of a rubber plug having a sleeve of material to which the plastic will not adhere, said sleeve being around the outside of the plug, said sleeve extending far enough so that the plastic to be embossed will not engage rubber.

3. An apparatus for producing an endless plastic belt having an embossing on one face thereof, said apparatus comprising top and bottom rigid plates, means for maintaining the same in spaced parallel relation, said top plate having a circular cut-out, a cylindrical member carried by said bottom plate and having the cylindrical surface thereof on the exterior formed as a die embossing surface and the ends thereof being shaped to provide outwardly extending ledges, said cylindrical member having the top closed, a plate disposed on top of said cylindrical member, a sleeve having at least one face of resilient material surrounding the embossing cylinder and extending beyond the ledges, said resilient face facing the embossing surface, said sleeve being removable through said cut-out, a rigid cylinder enclosing the outer surface of said resilient sleeve, means for creating a force to move said sleeve face toward the embossed die surface, said sleeve normally providing a clearance between it and the embossing surface for accommodating a plastic sheet to be embossed, and means for heating the die surface and plastic.

4. The apparatus according to claim 2 wherein said resilient sleeve has a liner of a fluorinated polyethylene for preventing contact between the plastic to be embossed and the resilient sleeve.

5. Apparatus for embossing the surface of a flexible plastic sheet of material susceptible to softening under heat, said apparatus comprising a chamber having rigid walls, one of said walls being cylindrical and having an unbroken, continuous embossing die surface on the inside surface thereof with inwardly extending ledges at the ends of the die surface, a plastic strip being adapted to be disposed in said chamber in proximity to said die surface, an expansible container disposed within said chamber, said chamber enclosing said expansible container on all sides, said container having a fluid conduit passing through a wall of said chamber for connection to a source of fluid for producing pressure within said container, said container having a resilient wall opposite the die surface and ledges, which wall can exert pressure on said plastic strip to force the same against the embossing die surface, said resilient wall having its pressure exerting face of a material of the group consisting of polytetrafluoroethylene, polytrifluorochloroethylene and silicone rubber, one of said chamber walls being movable to give access to said chamber for the purpose of removing an embossed plastic sheet and disposing a new plastic sheet therein and means for heating said die surface, said resilient wall cooperating with said ledges to seal the hot plastic against leakage.

6. Apparatus for embossing the surface of a flexible plastic sheet of material susceptible to softening under heat, said apparatus comprising a chamber having rigid walls, one of said walls being cylindrical and having an embossing die surface on the exterior thereof, a plastic strip being adapted to be disposed around the die surface, an annular expansible container disposed around said chamber, said container having a fluid conduit passing into the same for connection to a source of fluid for producing pressure within said container, said container having a resilient wall for impressing a force on said plastic strip to force the same against the embossing die, said resilient wall having its pressure exerting face of a material from the group consisting of polytetrafluoroethylene, polytrifluorochloroethylene and silicone rubber and means for heating said die surface.

7. The construction according to claim 1 wherein additional ledges beyond the first-named ledges are provided, said first-named ledges accommodating the plastic strip to be embossed, said additional ledges beyond said first-named ledges accommodating a strip of resilient material which is adapted to transmit the embossing force to said plastic strip to be embossed.

References Cited in the file of this patent

UNITED STATES PATENTS

| | | |
|---|---|---|
| Re. 12,095 | Macdonald | Mar. 10, 1903 |
| 601,825 | Conners | Apr. 5, 1898 |
| 649,385 | Wolcott | May 8, 1900 |
| 951,483 | Matthews | Mar. 8, 1910 |
| 1,260,002 | Lanhoffer | Mar. 19, 1918 |
| 1,482,185 | Egerton | Jan. 29, 1924 |
| 2,135,825 | Marguerat et al. | Nov. 8, 1938 |
| 2,172,243 | Goodnow | Sept. 5, 1939 |
| 2,230,654 | Plunkett | Feb. 4, 1941 |
| 2,558,823 | Crowley | July 3, 1951 |
| 2,573,642 | Hurry | Oct. 30, 1951 |
| 2,578,209 | Schwarz | Dec. 11, 1951 |
| 2,599,046 | Brucker | June 3, 1952 |
| 2,600,775 | Hurry et al. | June 17, 1952 |

OTHER REFERENCES

"Uses and Processing of Silicone Rubber," Modern Plastics, December 1946, pp. 102–104.

UNITED STATES PATENT OFFICE

CERTIFICATE OF CORRECTION

Patent No. 3,061,873

November 6, 1962

Michael C. Supitilov et al.

It is hereby certified that error appears in the above numbered patent requiring correction and that the said Letters Patent should read as corrected below.

Column 12, line 37, for the claim reference numeral "2" read -- 3 --.

Signed and sealed this 2nd day of April 1963.

(SEAL)
Attest:

ESTON G. JOHNSON

Attesting Officer

DAVID L. LADD

Commissioner of Patents